US012570270B2

(12) United States Patent
Cho

(10) Patent No.: US 12,570,270 B2
(45) Date of Patent: Mar. 10, 2026

(54) HYBRID ELECTRIC VEHICLE AND DRIVE CONTROL METHOD THEREOF

(71) Applicants:Hyundai Motor Company, Seoul (KR); Kia Corporation, Seoul (KR)

(72) Inventor: Jin Kyeom Cho, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/798,720

(22) Filed: Aug. 8, 2024

(65) Prior Publication Data

US 2025/0229766 A1 Jul. 17, 2025

(30) Foreign Application Priority Data

Jan. 11, 2024 (KR) ........................ 10-2024-0004878

(51) Int. Cl.
*B60W 20/40* (2016.01)
*B60W 10/02* (2006.01)
*B60W 20/15* (2016.01)

(52) U.S. Cl.
CPC ............ *B60W 20/40* (2013.01); *B60W 10/02* (2013.01); *B60W 20/15* (2016.01); *B60Y 2200/92* (2013.01); *Y02T 10/62* (2013.01)

(58) Field of Classification Search
None
See application file for complete search history.

(56) References Cited

U.S. PATENT DOCUMENTS

| 9,452,753 | B2 | 9/2016 | Kodawara | |
|---|---|---|---|---|
| 12,371,001 | B2 * | 7/2025 | Choi | B60K 6/48 |
| 2018/0354499 | A1 * | 12/2018 | Park | B60W 10/10 |
| 2020/0173381 | A1 * | 6/2020 | Lee | F02D 41/0045 |

FOREIGN PATENT DOCUMENTS

| JP | 2010-115934 | 5/2010 |
|---|---|---|
| JP | 4697247 | 6/2011 |
| JP | 2017-013643 | 1/2017 |
| JP | 2019-081438 | 5/2019 |
| JP | 2020-110041 | 7/2020 |
| KR | 10-2025-0110058 | 7/2025 |
| KR | 10-2025-0175182 | 12/2025 |

* cited by examiner

*Primary Examiner* — Peter D Nolan
*Assistant Examiner* — Michael F Whalen
(74) *Attorney, Agent, or Firm* — MORGAN, LEWIS & BOCKIUS LLP

(57) ABSTRACT

In a hybrid electric vehicle and a drive control method of a hybrid electric vehicle, the method includes determining residual values of an internal combustion drive system, an electric drive system, and a clutch included in a vehicle, the clutch being configured to selectively connect the internal combustion drive system and the electric drive system; determining a converted residual value of the internal combustion drive system and the electric drive system based on the determined residual values of the internal combustion drive system and the electric drive system and comparing the converted residual value with the residual value of the clutch; and when the determined converted residual value is greater than the residual value of the clutch, strengthening a connection state change requirement of the clutch.

20 Claims, 8 Drawing Sheets

HYBRID ELECTRIC VEHICLE AND DRIVE CONTROL METHOD THEREOF

CROSS-REFERENCE TO RELATED APPLICATION(S)

The present application claims priority to Korean Patent Application No. 10-2024-0004878, filed on Jan. 11, 2024, the entire contents of which is incorporated herein for all purposes by this reference.

BACKGROUND OF THE PRESENT DISCLOSURE

Field of the Present Disclosure

The present disclosure relates to a drive control method of a hybrid electric vehicle, by which operation of two different driving sources included in the hybrid electric vehicle is individually controlled according to a traveling situation.

DESCRIPTION OF RELATED ART

With the recent increase in environmental concerns, there is a rising trend toward eco-friendly vehicles provided with electric motors as power sources. These eco-friendly vehicles are also known as electrified vehicles, and a typical example may be hybrid electric vehicles (HEVs) and electric vehicles (EVs).

Unlike conventional internal combustion engine vehicles, an electrified vehicle has a motor and thus is able to obtain power required for traveling through the motor. Furthermore, a hybrid electric vehicle may provide optimal output and torque according to how an engine and a motor are harmoniously operated while the hybrid electric vehicle is traveling through two driving sources including the engine and the motor.

Meanwhile, as such electrified vehicles are increasingly entering the used-car market, the residual value of these vehicles has become more significant. The residual value of electrified vehicles tends to be largely affected by a component including the lowest residual value among the residual values of main components in the vehicle. Therefore, to increase the residual value of electrified vehicles, balancing the residual values of main components may be required to avoid unreasonable depreciation caused by the residual value of a particular main component in the vehicle being excessively lowered compared to the remaining main components.

A hybrid electric vehicle employing a parallel type (or transmission mounted electric drive (TMED)) hybrid system includes not only two driving sources including an engine and a motor, but also the motor and an engine clutch (ED) disposed between the engine and a transmission. Therefore, a method of balancing the residual values of the engine, motor, and engine clutch is needed.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to balancing the residual values of an engine, a motor, and an engine clutch included in a hybrid electric vehicle through the hybrid electric vehicle and a drive control method thereof.

The technical subjects pursued in the present disclosure may not be limited to the above-mentioned technical subjects, and other technical subjects which are not mentioned may be clearly understood, through the following descriptions, by those skilled in the art to which the present disclosure pertains.

In view of the foregoing, a drive control method of a hybrid electric vehicle according to an exemplary embodiment of the present disclosure may include: determining residual values of an internal combustion drive system, an electric drive system, and a clutch included in a vehicle, the clutch being configured to selectively connect the internal combustion drive system and the electric drive system; determining a converted residual value of the internal combustion drive system and the electric drive system based on the determined residual values of the internal combustion drive system and the electric drive system and comparing the converted residual value with the residual value of the clutch; and when the determined converted residual value is greater than the residual value of the clutch, strengthening a connection state change requirement of the clutch.

For example, the method may further include, after the determining, outputting information on the determined residual values of the internal combustion drive system, the electric drive system, and the clutch.

For example, the comparing may include: determining whether to enter a pre-configured residual value preservation control; and when the residual value preservation control is entered, determining the converted residual value and comparing the converted residual value with the residual value of the clutch.

For example, the comparing may further include, when the residual value preservation control is entered, determining one pre-configured detail setting mode among a plurality of detail setting modes including different strengthening degrees for the connection state change requirement.

For example, the strengthening may include: when the determined converted residual value is greater than the residual value of the clutch, comparing the residual values of the internal combustion drive system and the electric drive system; and when the residual value of the internal combustion drive system is greater than the residual value of the electric drive system, strengthening a disconnection requirement of the clutch.

For example, the strengthening may further include, when the residual value of the internal combustion drive system is greater than the residual value of the electric drive system, decreasing a release determination boundary value of a drive mode involving the internal combustion drive system to strengthen the disconnection requirement of the clutch.

For example, the strengthening may further include: when the residual value of the internal combustion drive system is greater than the residual value of the electric drive system, determining a correction value corresponding to one pre-configured detail setting mode among a plurality of detail setting modes including different strengthening degrees for the connection state change requirement; and subtracting the determined correction value from the release determination boundary value to decrease the release determination boundary value.

For example, the strengthening may further include, when the residual value of the internal combustion drive system is lower than the residual value of the electric drive system, strengthening a connection requirement of the clutch.

For example, the strengthening may further include, when the residual value of the internal combustion drive system is lower than the residual value of the electric drive system, increasing an entry determination boundary value of a drive mode involving the internal combustion drive system to strengthen the connection requirement of the clutch.

For example, the strengthening may further include: when the residual value of the internal combustion drive system is lower than the residual value of the electric drive system, determining a correction value corresponding to one pre-configured detail setting mode among a plurality of detail setting modes including different strengthening degrees for the connection state change requirement; and adding the determined correction value to the entry determination boundary value to increase the entry determination boundary value.

Furthermore, to achieve the task, a hybrid electric vehicle according to an exemplary embodiment of the present disclosure may include: a drive system including an internal combustion drive system and an electric drive system; a clutch configured to selectively connect the internal combustion drive system and the electric drive system; and a controller configured to determine a converted residual value of the internal combustion drive system and the electric drive system based on residual values of the internal combustion drive system, the electric drive system, and the clutch, compare the converted residual value with the residual value of the clutch, and when a result of the comparison indicates that the determined converted residual value is greater than the residual value of the clutch, strengthen a connection state change requirement of the clutch.

For example, the controller may be configured to output information on the residual values of the internal combustion drive system, the electric drive system, and the clutch.

For example, the controller may be configured to determine whether to enter a pre-configured residual value preservation control, and when the residual value preservation control is entered, determine the converted residual value and compare the converted residual value with the residual value of the clutch.

For example, the controller may be configured to, when the residual value preservation control is entered, determine one pre-configured detail setting mode among a plurality of detail setting modes including different strengthening degrees for the connection state change requirement.

For example, the controller may be configured to, when the determined converted residual value is greater than the residual value of the clutch, compare the residual values of the internal combustion drive system and the electric drive system, and when a result of the comparison indicates that the residual value of the internal combustion drive system is greater than the residual value of the electric drive system, strengthen a disconnection requirement of the clutch.

For example, the controller may be configured to, when the residual value of the internal combustion drive system is greater than the residual value of the electric drive system, decrease a release determination boundary value of a drive mode involving the internal combustion drive system to strengthen the disconnection requirement of the clutch.

For example, the controller may be configured to, when the residual value of the internal combustion drive system is greater than the residual value of the electric drive system, determine a correction value corresponding to one pre-configured detail setting mode among a plurality of detail setting modes including different strengthening degrees for the connection state change requirement, and subtract the determined correction value from the release determination boundary value to decrease the release determination boundary value.

For example, the controller may be configured to, when a result of the comparison indicates that the residual value of the internal combustion drive system is lower than the residual value of the electric drive system, strengthen a connection requirement of the clutch.

For example, the controller may be configured to, when the residual value of the internal combustion drive system is lower than the residual value of the electric drive system, increase an entry determination boundary value of a drive mode involving the internal combustion drive system to strengthen the connection requirement of the clutch.

For example, the controller may be configured to, when the residual value of the internal combustion drive system is lower than the residual value of the electric drive system, determine a correction value corresponding to one pre-configured detail setting mode among a plurality of detail setting modes including different strengthening degrees for the connection state change requirement, and add the determined correction value to the entry determination boundary value to increase the entry determination boundary value.

According to the above description, in a hybrid electric vehicle and a drive control method thereof according to an exemplary embodiment of the present disclosure, when a converted residual value of an internal combustion drive system and an electric drive system is greater than that of a clutch connecting the internal combustion drive system and the electric drive system, a connection state change requirement of the clutch is strengthened, whereby degradation of the residual value of the clutch may be prevented and simultaneously, degradation of the residual value of the hybrid electric vehicle may be avoided.

Advantageous effects obtainable from the present disclosure may not be limited to the above-mentioned effects, and other effects which are not mentioned may be clearly understood, through the following descriptions, by those skilled in the art to which the present disclosure pertains.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
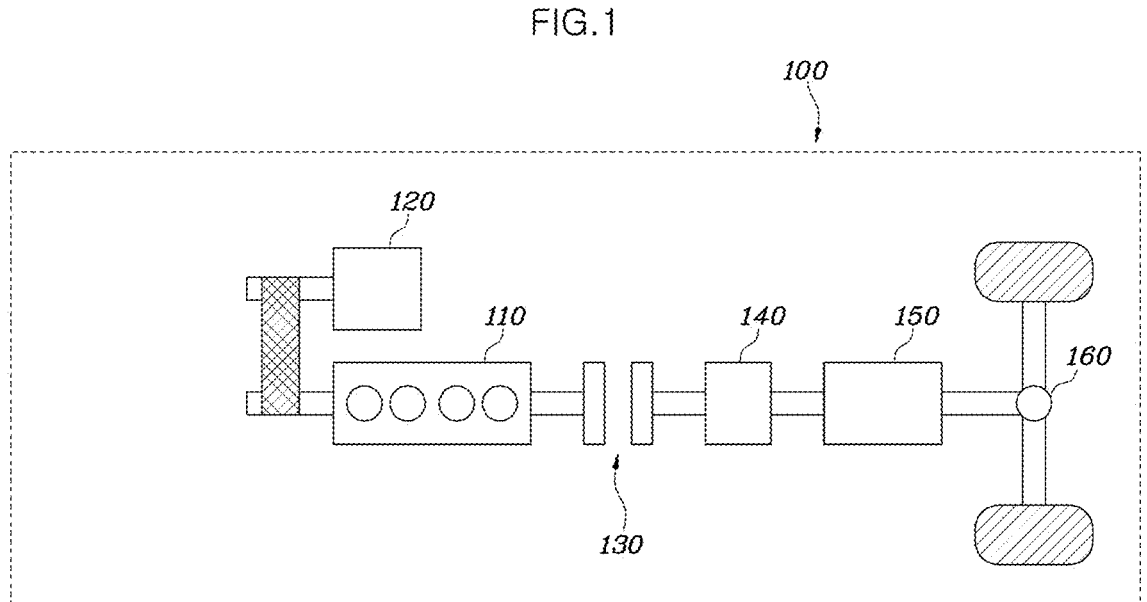
FIG. 1 is a diagram illustrating an example of a powertrain apparatus configuration of a hybrid electric vehicle which is applicable to various exemplary embodiments of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In describing embodiments included in the present specification, when the detailed description of the relevant known technology is determined to unnecessarily obscure the gist of the present disclosure, the detailed description may be omitted. Furthermore, the accompanying drawings are provided only for easy understanding of the exemplary embodiments disclosed in the present specification, and the technical spirit disclosed herein is not limited to the accompanying drawings, and it should be understood that all changes, equivalents, or substitutes thereof are included in the spirit and scope of the present disclosure.

In the following description of embodiments, the term "predetermined" means that, when a parameter is used in a process or algorithm, the numerical value of the parameter is determined in advance. According to various exemplary embodiments of the present disclosure, the numerical value of the parameter may be set when the process or algorithm is started or during a period in which the process or algorithm is performed.

The terms "module" and "unit" used for the elements in the following description are provided or interchangeably used in consideration of only the case of writing the specification, and do not have distinct meanings or roles by themselves.

In describing the exemplary embodiments included in the present specification, when the detailed description of the relevant known technology is determined to unnecessarily obscure the gist of the present disclosure, the detailed description may be omitted. Furthermore, the accompanying drawings are provided only for easy understanding of the exemplary embodiments included in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "comprise", "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

A unit or a control unit included in names such as a motor control unit (MCU) and a hybrid control unit (HCU) is merely a term widely used for naming a controller configured to control a specific function of a vehicle, but does not mean a generic function unit. For example, each controller may include a communication device configured to communicate with a sensor or another control unit, a memory configured to store an operation system, a logic command, or input/output information, and at least one processor configured to perform determination, calculation, decision or the like which are required for responsible function controlling.

Hereinafter, various exemplary embodiments included in the present specification will be described in detail with reference to the accompanying drawings, and the same or similar elements are provided the same and similar reference numerals, so duplicate descriptions thereof will be omitted.

Figure 2:
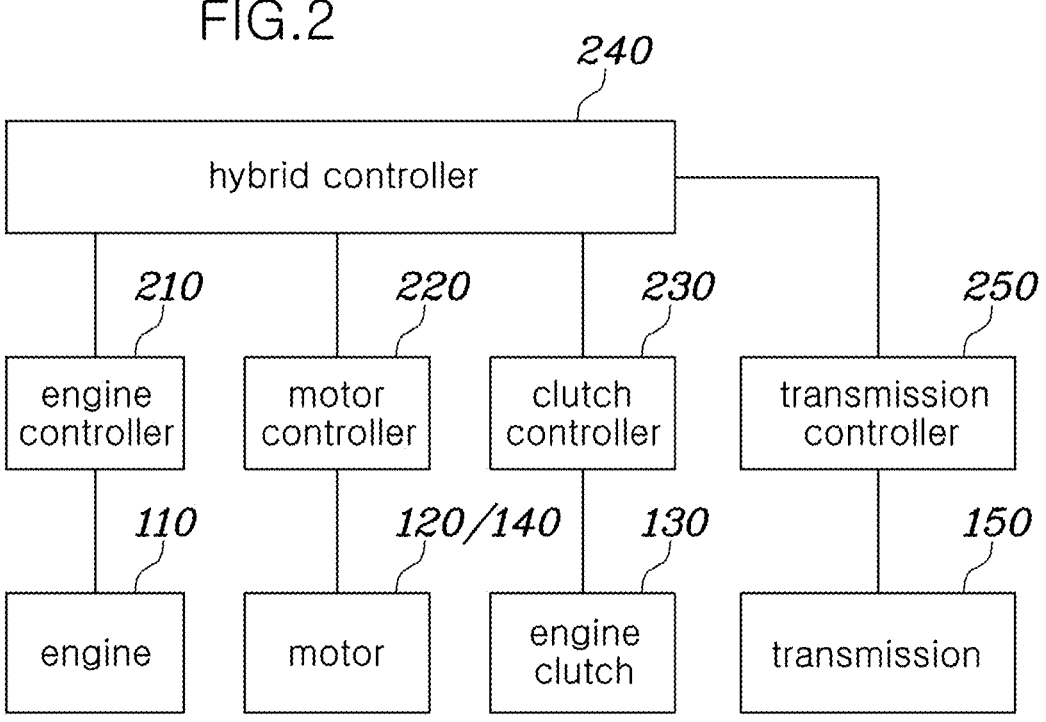
FIG. 2 is a diagram illustrating an example of a control system configuration of a hybrid electric vehicle which is applicable to various exemplary embodiments of the present disclosure.

First, with reference to FIG. 1 and FIG. 2, a structure and a control system of a hybrid electric vehicle applicable to various exemplary embodiments of the present disclosure are described.

FIG. 1 is a diagram illustrating an example of a powertrain configuration of a hybrid electric vehicle which is applicable to various exemplary embodiments of the present disclosure, and FIG. 2 is a diagram illustrating an example of a control system configuration of a hybrid electric vehicle which is applicable to various exemplary embodiments of the present disclosure.

Referring to FIG. 1, a powertrain apparatus of a hybrid electric vehicle 100 employing a parallel type hybrid system provided with an electric motor (or driving motor) 140 and an engine clutch 130 between an internal combustion engine (ICE) 110 and a transmission 150 is illustrated.

A drive system of the hybrid electric vehicle may be divided largely into an internal combustion drive system and an electric drive system, a typical example of the internal combustion drive system may be the engine 110, and a typical example of the electric drive system may be motors 120 and 140. Furthermore, the internal combustion drive system and the electric drive system may include other elements connected to the engine 110 and the motor 120 for operation thereof, as well as the engine 110 and the motors 120 and 140, respectively. For example, the electric drive system may include an inverter and a battery for the operation of the motors 120 and 140, as well as the motors 120 and 140. Furthermore, the internal combustion drive system and the electric drive system may include a mutual influence relation that makes the operation of one drive system affect the operation of the other drive system.

The clutch 130 may selectively connect the internal combustion drive system and the electric drive system. That is, according to a state of the clutch 130, the internal combustion drive system and the electric drive system may be connected to or disconnected from each other.

In the hybrid electric vehicle including such the drive system, in general, when a driver presses an accelerator after starting the vehicle (i.e., a gas pedal sensor is turned on), the driving motor 140 is first driven using the electric power of a battery while the clutch 130 is opened, and the power of the motor 140 is transferred to wheels through the transmission 150 and a final drive (FD) 160 so that the wheels move (i.e., EV mode). As the vehicle is steadily accelerated and thus a required driving force gradually increases, the auxiliary motor (or starter and generator motor 120) may operate to drive the engine 110.

Accordingly, when the difference between the rotation speeds of the engine 110 and the motor 140 becomes within a particular range, the engine clutch 130 is engaged so that the engine 110 and the mode 140 both drive the vehicle (i.e., transition from EV mode to HEV mode). When a pre-configured engine off requirement, such as deceleration of the vehicle, is satisfied, the engine clutch 130 is opened and the engine 110 is stopped (i.e., transition from HEV mode to EV mode). At this the present time, the vehicle charges a battery through the driving motor 140 by use of the driving force of the wheels, and this is called braking energy regeneration or regenerative braking.

The starter and generator motor 120 performs a role of a start motor when the engine 110 is started, and operates as a generator when the rotation energy of the engine 110 is recovered after the engine is started or when same is turned off. Therefore, same may be called a hybrid starter generator (HSG).

Generally, a step-variable transmission or a multi-plate clutch, for example, a dual clutch transmission (DCT) may be used as the transmission 150.

FIG. 1 illustrates a configuration example of a drive system of a hybrid electric vehicle applicable to various exemplary embodiments of the present disclosure. The configuration of a drive system of a hybrid electric vehicle applicable to various exemplary embodiments of the present disclosure is not necessarily limited thereto.

For example, a drive system of a hybrid electric vehicle applicable to various exemplary embodiments of the present disclosure may have, unlike the drive system illustrated in FIG. 1, a structure in which one of a plurality of motors is disposed between the engine 110 and one end portion of the engine clutch 130, the shaft of the motor is directly connected to the engine shaft of the engine 110 and always rotates together therewith, and another motor of the plurality of motors connects the other end portion of the engine clutch 130 and the transmission 150.

Moreover, in addition to the above example, if a configuration includes the engine 110 and the motor 120 together to provide power required in a vehicle, the configuration is applicable to various exemplary embodiments of the present disclosure regardless of a specific connection relation or structure of the engine 110, the motor 120, and elements connected thereto.

FIG. 2 is a diagram illustrating a configuration of a control system of a hybrid electric vehicle which is applicable to various exemplary embodiments of the present disclosure.

Referring to FIG. 2, in a hybrid electric vehicle which is applicable to various exemplary embodiments of the present disclosure, the engine 110 may be controlled by an engine controller 210, the starter and generator motor 120 and the driving motor 140 may be controlled by a motor controller (motor control unit (MCU)) 220, and the engine clutch 130 may be controlled by a clutch controller 230. The engine controller 210 is also called an engine management system (EMS). Furthermore, the transmission 150 may be controlled by a transmission controller 250.

Each controller is connected to a hybrid controller (hybrid control unit (HCU)) 240, which is configured to control the overall mode switching process as a higher controller of each controller, and may change a traveling mode according to control of the hybrid controller 240, provide information required for engine clutch control at the time of gear shifting and/or information required for engine stop control to the hybrid controller 240, or perform an operation according to a control signal.

For example, the hybrid controller 240 may be configured to determine whether to switch between EV and HEV modes or between charge-depleting (CD) and charge-sustaining (CS) modes according to a driving state of the vehicle. To the present end, the hybrid controller may be configured to determine a disconnection (open) time point of the engine clutch 130 and perform a hydraulic control at the time of disconnection.

Furthermore, the hybrid controller 240 may be configured to determine a state (lock-up, slip, open, etc.) of the engine clutch 130 and control a time point of stopping fuel spraying of the engine 110.

Furthermore, the hybrid controller 240 may transfer, for an engine stop control, a torque command for controlling the torque of the starter and generator motor 120 to the motor controller 220 to control the recovery of engine rotation energy.

Furthermore, the hybrid controller 240 may be configured for controlling a lower controller configured for determination of a mode switching requirement and for switching at the time of a mode switching control.

The connection relation between the above controllers and the function/classification of each controller are an example, and are not limited by any names. For example, the hybrid controller 240 may be implemented so that the corresponding functions are replaced and provided by one of the controllers other than the hybrid controller, or are dispersively provided by two or more of the other controllers.

The configurations of FIG. 1 and FIG. 2 described above merely correspond to a configuration example of the hybrid electric vehicle 100, and it would be obvious to a person skilled in the art that the hybrid electric vehicle 100 applicable to an exemplary embodiment of the present disclosure is not limited to such a structure.

A hybrid electric vehicle according to various exemplary embodiments of the present disclosure proposes to restrain, through a residual value preservation control, the operation of a component having a relatively low residual value among main components including a plurality of drive systems and a clutch included in the vehicle, and accordingly, prevent the residual value of any one of the main components from being remarkably lowered than those of the other components and allow the residual values to be balanced, to efficiently manage the total residual value of the vehicle.

The residual value of the main components including each drive system and the clutch included in the vehicle may indicate a value of a current state obtained by reflecting depreciation due to usage on a value of an unused state, such as a factory price.

Such a residual value may be determined through inspection on at least one predetermined evaluation item, and the evaluation item may include aspects, such as quality, performance, and state. Furthermore, the above evaluation item may be evaluated through a total operation amount, a total operation time, and the like, and in evaluation, the characteristic of each component may be considered.

For example, the residual value of an internal combustion drive system may be determined in consideration of factors including a consumed fuel amount, an overheating history, a vibration and noise occurrence history, and a cylinder pressure, and the residual value of an electric drive system may be determined in consideration of a charge and discharge history of a battery, a deterioration degree of the battery, the output voltage, frequency, and power conversion efficiency of an inverter, etc. Furthermore, in determination of the residual value of the clutch, a connection/disconnection history of the clutch may be considered.

The residual value of each component described above may be autonomously determined by a controller, included in the hybrid electric vehicle, such as a hybrid controller, an engine controller, a motor controller, or a clutch controller, or may be determined through a separate device. However, various exemplary embodiments of the present disclosure may be applied regardless of a detailed determination scheme for a residual value.

A total residual value of the vehicle may be determined through the residual values of main components, and when the total residual value of the vehicle is determined, the residual value of a component having a relatively low residual value may be crucial. For example, the total residual value of the vehicle may be determined by the residual value of a component having the lowest residual value regardless of the residual values of the other components.

Hereinafter, a control for preserving the residual value of a hybrid electric vehicle according to an exemplary embodiment of the present disclosure is described in detail with reference to FIG. 3.

Figure 3:
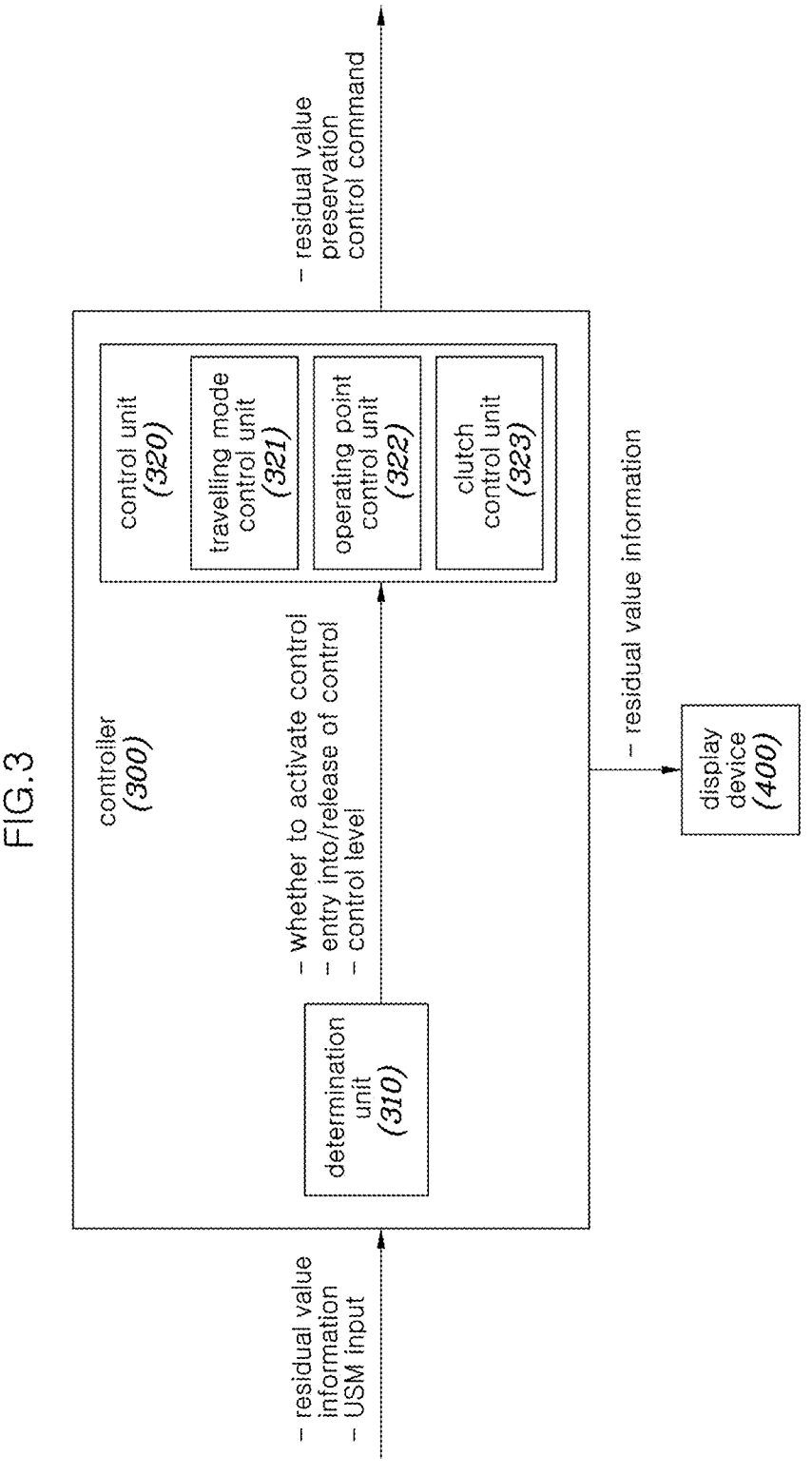
FIG. 3 is a diagram illustrating an operation performed by a controller of a hybrid electric vehicle according to an exemplary embodiment of the present disclosure.

FIG. 3 is a diagram illustrating an operation performed by a controller of a hybrid electric vehicle according to an exemplary embodiment of the present disclosure.

Referring to FIG. 3, a controller 300 of a hybrid electric vehicle according to an exemplary embodiment of the present disclosure may enter a residual value preservation control for balancing the residual values of an internal combustion drive system, an electric drive system, and a clutch based on the residual values thereof, and when the controller has entered the residual value preservation control, may perform at least one of a traveling mode control, an operating point control, and a clutch control.

To the present end, the controller 300 may obtain residual value information and user setting mode (USM) input information, and output a residual value preservation control command, and a residual value determined according to the obtained information.

In the instant case, the residual value information may include information for determining the residual values of the internal combustion drive system, the electric drive system, and the clutch, or information on a residual value predetermined for each of the internal combustion drive system, the electric drive system, and the clutch.

That is, according to an exemplary embodiment of the present disclosure, the controller 300 may obtain information for determining the residual values of the internal combustion drive system, the electric drive system, and the clutch, and based on the obtained information, directly determine the residual values of the internal combustion drive system, the electric drive system, and the clutch, or may obtain the residual values of the internal combustion drive system, the electric drive system, and the clutch determined outside the controller 300.

The USM input information may include, for example, whether to activate a residual value preservation function, a control level, etc., and may be input through an input button provided on a steering wheel, a center fascia, etc.

The residual value preservation control command may include a traveling mode control command, an operating point control command, and a clutch control command, and each command may be transferred to the engine 110, the motors 120 and 140, and the clutch 130 to involve the operation of the engine 110, the motors 120 and 140, and the clutch 130.

Output residual value information may include the residual values of the internal combustion drive system, the electric drive system, and the clutch, and a total residual value of the vehicle converted from the respective residual values.

In a process of obtaining or transferring the pieces of input information and output information described above, communication in the vehicle, such as a Controller Area Network (CAN) or a Local Interconnect Network (LIN), may be accompanied.

The controller 300 according to an exemplary embodiment of the present disclosure includes an output value related to the control of the drive system and thus may be implemented as the hybrid controller 240 or a function thereof, the hybrid controller being a higher controller of the engine controller 210 and the motor controller 220 controlling respective drive systems. However, this is an example, and the implementation scheme of the controller 300 is not necessarily limited thereto and may also be implemented by a combination of a separate controller or the engine controller 210 and the motor controller 220.

Meanwhile, the output residual value information may be transferred to a display device 400, and the display device 400 may express the information on a residual value through a visual or auditory method to provide the information on the residual value to a vehicle user, such as a driver, to recognize same.

In the instant case, the display device 400 may include a cluster included in the vehicle, an audio video navigation (AVN) device, and a terminal of a vehicle user, such as a driver.

More detail contents related to the information expressed by the display device 400 is provided below with reference to FIG. 4A and FIG. 4B.

Figures 4A, 4B:
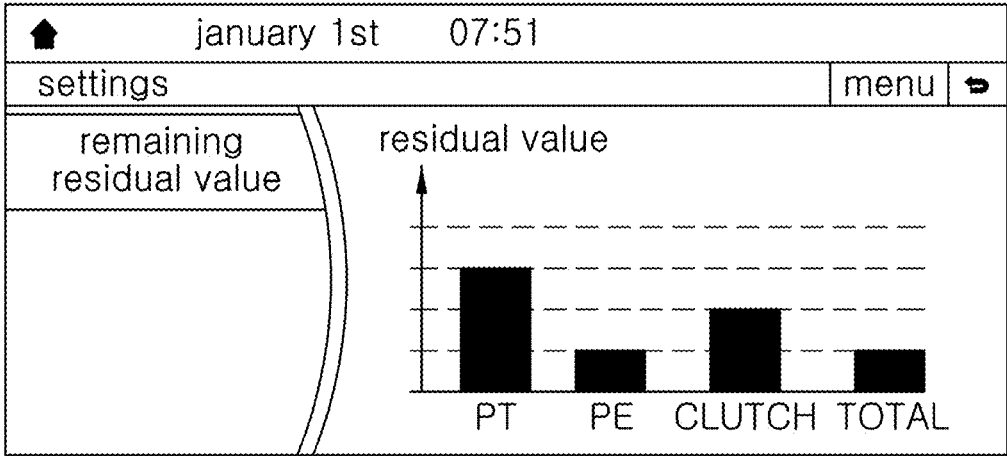
FIG. 4A and FIG. 4B are diagrams illustrating information expressed through a display device of a hybrid electric vehicle according to an exemplary embodiment of the present disclosure.

FIG. 4A and FIG. 4B are diagrams illustrating information expressed through a display device of a hybrid electric vehicle according to an exemplary embodiment of the present disclosure.

First, referring to FIG. 4A, information on a residual value being expressed through a screen of the display device 400 is illustrated.

In the instant case, on the screen of the display device 400, residual values corresponding to an internal combustion drive system (PT), an electric drive system (PE), and a clutch (CLUTCH) may be displayed in a form of a graph, and a total residual value (TOTAL) of the vehicle determined based on the respective residual values of the internal combustion drive system (PT), the electric drive system (PE), and the clutch (CLUTCH) may be displayed together.

The total residual value (TOTAL) of the vehicle may be determined, as illustrated in FIG. 4A, to correspond to the lowest residual value among the residual values of the internal combustion drive system (PT), the electric drive system (PE), and the clutch (CLUTCH).

As described above, the residual values of main components of the vehicle and a total residual value of the vehicle obtained thereby are displayed through the display device 400, whereby a vehicle user, such as a driver, is able to recognize the current residual value of the vehicle and reflect a result of the recognition on determining whether to activate a residual value preservation control function, and determining a control level.

Next, referring to FIG. 4B, information on a control level being expressed through the screen of the display device 400 is illustrated.

The display device 400 may display a pre-configured control level through the screen with respect to an involvement degree of a residual value preservation control, and the control level may be classified as, for example, stages of Lv 1-Lv 5.

Such the control level may be configured based on USM input information input by a vehicle user, such as a driver, or may be variably configured based on the state or the current residual value of the vehicle.

The vehicle user, such as a driver, may identify a currently-configured control level through the display device 400, and because a residual value preservation control may be differentially controlled according to a configured control level, the control level may help the vehicle user, such as a driver, in determining whether to increase or decrease the involvement degree of the residual value preservation control from the current level. For example, in a case where the vehicle user, such as a driver, feels a grievance on driving comfort or driving performance when a residual value preservation control is performed, the vehicle user may lower the control level to reduce the involvement degree of the residual value preservation control. In a case where the vehicle user feels enough driving comfort or driving performance in the current state and is to manage the residual values, the vehicle user may increase the control level to raise the involvement degree of the residual value preservation control.

Referring to FIG. 3 again, the controller 300 according to various exemplary embodiments of the present disclosure may include a determination unit 310 and a control unit 320, and hereinafter, a detailed configuration and operations of the controller 300 according to an exemplary embodiment of the present disclosure is described in more detail.

The residual value of components provided in a vehicle decreases as same are used, and the residual value of the vehicle tends to be heavily influenced by a component having the lowest residual value among the residual values of the components provided in the vehicle. Therefore, to prevent the residual value of a vehicle from being degraded by the residual value of a particular main component in the vehicle being excessively lowered compared to the remaining main components, it may be required to determine the residual values of main components provided in the vehicle and control a main component having the lowest residual value to be used less. Accordingly, a residual value preservation mode of determining the lowest residual value based on respective residual values determined in the residual value determination unit 310 and controlling, to be used less, a component including the lowest residual value among the internal combustion drive system, the electric drive system, and the clutch may be configured for the vehicle.

First, the determination unit 310 may be configured to determine whether to enter a residual value preservation control for balancing residual values, based on the residual values of the internal combustion drive system, the electric drive system, and the clutch. In the instant case, the determination unit 310 may directly determine respective residual values or obtain the residual values of respective drive systems from the outside thereof to determine whether to enter a residual value preservation control.

Furthermore, the determination unit 310 may be configured to determine which control to perform among a traveling mode control, an operating point control, and a clutch control as the residual value preservation control, based on the residual values of the internal combustion drive system, the electric drive system, and the clutch.

For example, if the difference between the residual values of the internal combustion drive system and the electric drive system is out of a pre-configured range, the determination unit 310 may enter a residual value preservation control and transfer, to the control unit 320, control entry information allowing at least one of a traveling mode control and an operating point control to be performed.

Furthermore, the determination unit 310 may be configured to determine whether to enter a residual value preservation control, based on the residual value of the clutch and a converted residual value of the drive system for the residual value of the clutch, and in the instant case, if a residual value preservation control is entered, may transfer, to the control unit 320, control entry information allowing a clutch control to be performed. The converted residual value of the drive system for the residual value of the clutch may mean, for example, the average of the residual values of the internal combustion drive system and the electric drive system.

The determination unit 310 may be configured to determine the residual values of the internal combustion drive system, the electric drive system, and the clutch provided in the vehicle, the clutch selectively connecting the internal combustion drive system and the electric drive system, determine a converted residual value of the internal combustion drive system and the electric drive system based on the determined residual values of the internal combustion drive system and the electric drive system, and compare the converted residual value with the residual value of the clutch.

If a result of the comparison indicates that the determined converted residual value is greater than the residual value of the clutch, the determination unit 310 may compare the respective residual values of the internal combustion drive system and the electric drive system. Accordingly, if the determined converted residual value is greater than the residual value of the clutch, the determination unit 310 may transfer, to the control unit 320 described below, information obtained by comparison between the residual values of the internal combustion drive system and the electric drive system so that a control for preventing degradation of the residual value of the clutch is performed. The determination unit 310 may transfer, to the control unit 320, the information obtained by comparison between the residual values of the internal combustion drive system and the electric drive system to allow the control unit 320 to perform different controls for a case where the residual value of the internal combustion drive system is greater than that of the electric drive system and a case where the residual value of the internal combustion drive system is lower than that of the electric drive system.

Furthermore, in a case where a residual value conservation control is entered, the determination unit 310 may be configured to determine one pre-configured detail setting mode among a plurality of detail setting modes including different strengthening degrees for a connection state change requirement of the clutch. The plurality of detail setting modes may be configured by a driver or user simultaneously with entry into the residual value conservation control. For example, the driver or user may determine information on a residual value output on the display device 400 to configure one detail setting mode among a plurality of detail setting modes.

Furthermore, the determination unit 310 may be configured to determine whether to activate a residual value balance control function based on obtained USM input information, and may reflect whether to activate the residual value balance control function on determination of whether to enter a control. For example, the determination unit 310 may be configured to determine to enter a residual value preservation control under a condition that a residual value balance control function, the activation or deactivation of which is determined based on the user's input, is to be activated, and accordingly, if the residual value balance control function is deactivated, may allow the residual value preservation control not to be performed.

Furthermore, the determination unit 310 may transfer a pre-configured control level to the control unit 320 with respect to the involvement degree of a residual value preservation control to allow the control unit 320 to differentially perform the residual value preservation control based on the control level.

In the instant case, the pre-configured control level may be configured according to, for example, an input of a user, such as a driver, and may be transferred to the determination unit 310 after being included in USM input information.

The control level may act, for example so that the higher the control level, the higher the degree by which a traveling mode control, an operating point control, and a clutch control involves the operation of the internal combustion drive system, the electric drive system, and the clutch.

As described above, whether to activate a residual value preservation control function, and a control level are reflected whereby the intention of a vehicle user, such as a driver, may be reflected. For example, when the user gives a weight to preservation of the residual value of the vehicle, the user may activate a residual value preservation control function, and configure a high control level to increase the involvement degree of a residual value preservation control. On the other hand, when the user values driving performance or driving comfort, the user may deactivate a residual value preservation control function or configure a low control level to decrease the involvement degree of a residual value preservation control.

The control unit 320 may perform, as a residual value preservation control, at least one of a traveling mode control, an operating point control, and a clutch control, and to the present end, may include a traveling mode control unit 321, an operating point control unit 322, and a clutch control unit 323.

First, the traveling mode control unit 321 may adjust a power output requirement of at least one of the internal combustion drive system and the electric drive system, performing a traveling mode control.

The power output requirement may be configured to determine whether to be able to output power through each drive system or an available output degree, and the operation of each drive system may be restrained or triggered according to adjustment of the power output requirement. For example, in a case where the operation of a particular drive system is restrained, the frequency at which or period for which the drive system outputs power, or the size of output power may be reduced, and in a case where the operation of a particular drive system is triggered, the frequency at which or period for which the drive system outputs power, or the amount of output power may be increased.

The traveling mode control unit 321 may raise a power output requirement of a drive system having a lower residual value among the internal combustion drive system and the electric drive system to alleviate a fall in the residual value of a drive system having a relatively low residual value, performing a traveling mode control.

If a power output requirement of a drive system having a relatively low residual value is raised (i.e., the drive system becomes hard to output power), a ratio by which the vehicle is operated through the power of the drive system having a low residual value may be reduced.

As the ratio by which the vehicle is operated through the power of a particular drive system is increased, the operation of the drive system is increased and the residual value thereof may be reduced as much as the increase of the operation. Therefore, the ratio by which the vehicle is operated through a particular drive system is reduced thereby alleviating the reduction of the residual value of the drive system, that is, preserving the residual value thereof.

Therefore, when a power output requirement of a drive system having a low residual value is raised, the reduction of the residual value of the drive system having the low residual value may be alleviated, and accordingly, the residual value of the entire vehicle dependent on the drive system having the low residual value may be preserved.

Furthermore, the traveling mode control unit 321 may lower a power output requirement of a drive system having a relatively high residual value (i.e., make the drive system easy to output power), performing a traveling mode control. In the instant case, the ratio by which the vehicle is operated through the power of a drive system having a relatively high residual value may be increased, and the ratio by which the vehicle is operated through a drive system having a lower residual value is reduced as much as the ratio does. Consequently, the fall in the residual value of the drive system having the lower residual value may be alleviated.

In the instant case, the residual value of the drive system having the relatively high residual value may be reduced, but the reduction slightly affects the total residual value of the vehicle compared to the drive system having the relatively lower residual value. Therefore, in view of the entire drive system, the power for operating the vehicle is satisfied and the residual value of the vehicle may be efficiently preserved.

Meanwhile, a power output requirement may be adjusted through change of a baseline dividing, on a graph of vehicle speed and torque, into areas in which the internal combustion drive system and the electric drive system are operated as a main driving source, respectively.

The operating point control unit 322 may adjust a ratio of required torque being distributed to the internal combustion drive system and the electric drive system, performing an operating point control.

For example, the operating point control unit 322 may lower a ratio of required torque being distributed to a drive system having a relatively low residual value among the internal combustion drive system and the electric drive system, and increase a ratio of required torque being distributed to a drive system having a relatively high residual value, performing an operating point control, and accordingly, may reduce the output amount of the drive system having the relatively low residual value to preserve the residual value thereof.

The clutch control unit 323 may raise a connection state change requirement of the clutch, performing a clutch control.

In a case where a connection state change requirement of the clutch is raised, the change of the clutch from a connected state to a disconnected state or from a disconnected state to a connected state becomes difficult, and thus the state change of the clutch is reduced as much as the difficulty. The more frequent the state change of the clutch, the lower the residual value of the clutch, and thus a connection state change requirement of the clutch may be raised as described above to preserve the residual value of the clutch.

If a result of comparison in the determination unit 310 indicates that the converted residual value of the internal combustion drive system and the electric drive system is greater than the residual value of the clutch, the clutch control unit 323 may strengthen a connection state change requirement of the clutch.

For example, if the converted residual value is greater than the residual value of the clutch, the clutch control unit 323 may receive a result of comparison between the residual values of the internal combustion drive system and the electric drive system, and strengthen a connection state change requirement of the clutch according to the result of the comparison. This operation is described below in detail with reference to FIG. 5 and FIG. 6.

A function of the clutch control unit 323 may be activated when the converted residual value is greater than the residual value of the clutch and the residual value of the internal combustion drive system is lower than that of the electric drive system, and in the instant case, a connection requirement of the clutch may be strengthened. Accordingly, a function of the clutch control unit 323 may be activated when the converted residual value is greater than the residual value of the clutch and the residual value of the internal combustion drive system is greater than that of the electric drive system, and in the instant case, a disconnection requirement of the clutch may be strengthened.

The clutch control unit 323 may perform control to minimize the use of a component having a lower residual value, and for example, the clutch control unit 323 may perform control to minimize the use of the clutch and the internal combustion drive system having lower residual values. The clutch control unit 323 may, if the residual value of the internal combustion drive system is lower than that of the electric drive system, determine a correction value corresponding to one pre-configured detail setting mode among a plurality of detail setting modes having different strengthening degrees for a connection state change requirement. For example, the correction value may be a test value determined through a vehicle test under a particular condition, and the correction value may be stored in the control unit 320 or the clutch control unit 323 in advance in a form of a data map to correspond to each of the plurality of detail setting modes. In the instant case, the clutch control unit 323 may load the pre-stored data map, and determine a correction value corresponding to one pre-configured detail setting mode based on the loaded data map. However, this is an example, and the present disclosure is not necessarily limited thereto.

The clutch control unit 323 may increase, based on the determined correction value, an entry determination boundary value of a drive mode involving the internal combustion drive system, to strengthen a connection requirement of the clutch. This operation is described in detail with reference to FIG. 5.

Figure 5:
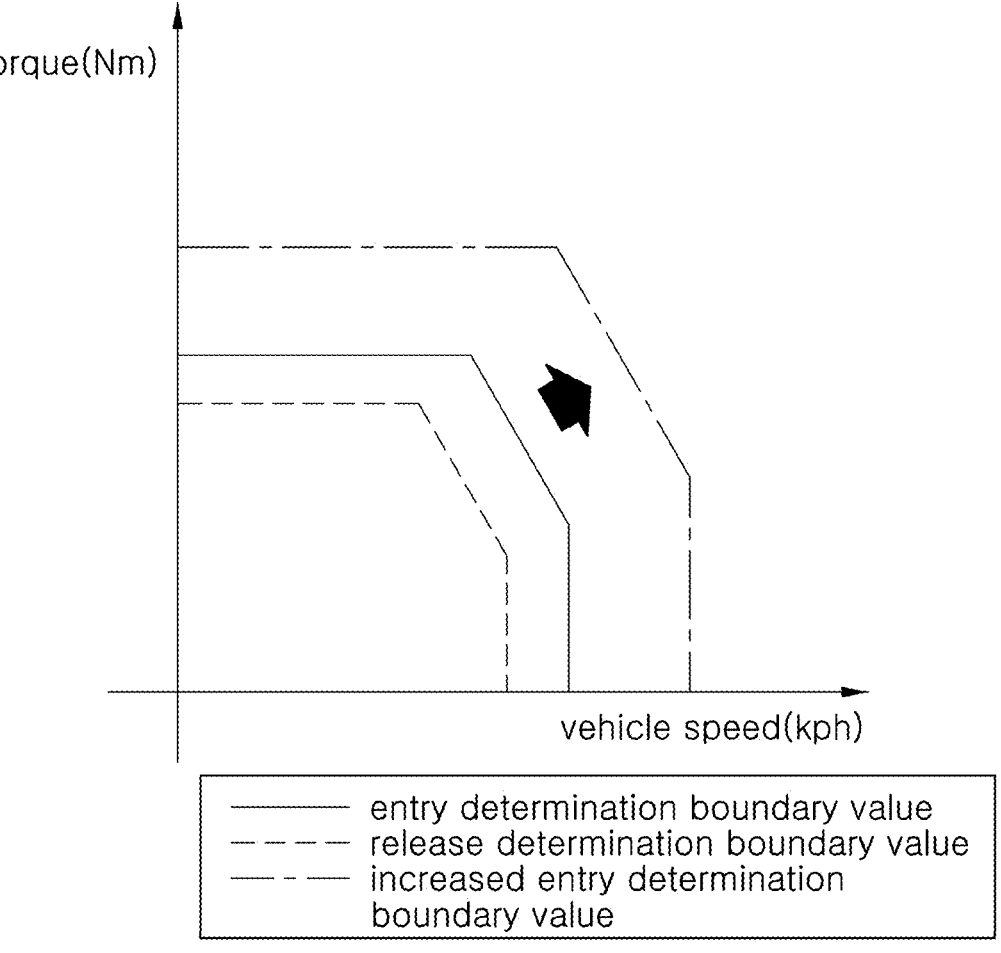
FIG. 5 and FIG. 6 are diagrams illustrating strengthening of a connection state change requirement of a clutch of a hybrid electric vehicle according to an exemplary embodiment of the present disclosure.
Figure 6:
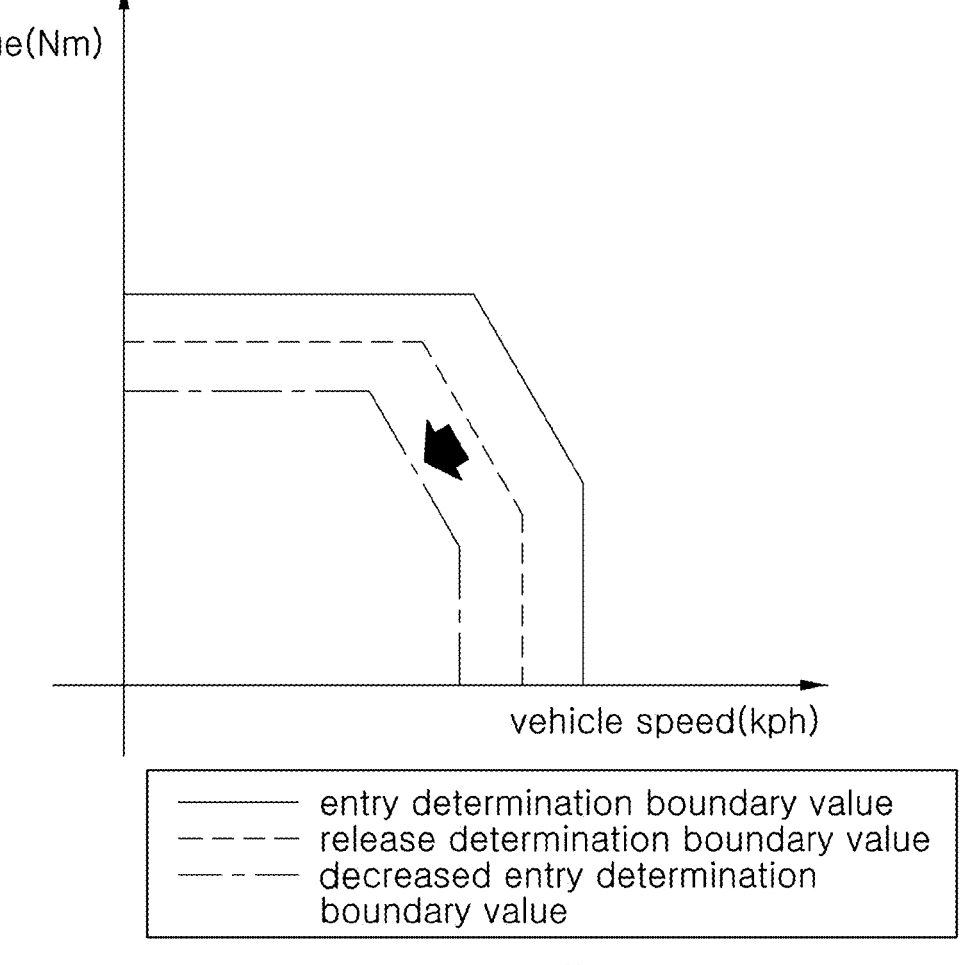

FIG. 5 and FIG. 6 are diagrams illustrating strengthening of a connection state change requirement of a clutch of a hybrid electric vehicle according to an exemplary embodiment of the present disclosure.

First, referring to FIG. 5, a boundary value for controlling a drive mode of a vehicle according to the vehicle speed and required torque of the vehicle may be configured for the vehicle, and the boundary value may be configured in a form of a boundary line on a graph. For example, in a case of a hybrid electric vehicle, a boundary value for controlling operation in a drive mode (e.g., EV mode) using an electric drive system (motor) and a drive mode (e.g., HEV mode) using an internal combustion drive system (engine) and the electric drive system (motor) together may be configured. A boundary value may have only one line shape in some cases, but if a drive mode of a hybrid electric vehicle is changed based on the one boundary value, there may occur a problem in that the change of the drive mode is frequent near to the boundary value.

However, a plurality of boundary values (solid line and dotted line) for controlling the drive mode of a hybrid electric vehicle may be configured for the controller 300 of the present disclosure in consideration of this hysteresis. For example, a solid line may indicate an entry determination boundary value for terminating a drive mode of an electric drive system and determining entry into a drive mode using an internal combustion drive system and the electric drive system together, and a dotted line may indicate a release determination boundary value for terminating the drive mode using the internal combustion drive system and the electric drive system together and determining entry into the drive mode using the electric drive system.

The clutch control unit 323 according to an exemplary embodiment of the present disclosure may increase an entry determination boundary value based on a correction value determined earlier. The clutch control unit 323 may add the determined correction value to an existing entry determination boundary value (solid line) to increase the entry determination boundary value (to correspond to an alternate long and short dash line). The clutch control unit 323 may increase the entry determination boundary value so that entry into the drive mode involving the internal combustion drive system becomes difficult, and thus the longer operation time of the drive mode using the electric drive system may be secured. The drive mode using the electric drive system may be performed in a state where the clutch is disconnected. Therefore, making entry into the drive mode involving the internal combustion drive system be difficult and securing more operation time of the drive mode using the electric drive system may strengthen a connection requirement of the clutch to maintain the state of the disconnected clutch. That is, the entry determination boundary value is increased to use a drive system having a high residual value more and maximally maintain the clutch having a low residual value at an existing operation state (e.g., disconnected state), whereby degradation of the residual value of the clutch and degradation of the residual value of the vehicle caused thereby may be prevented.

Furthermore, referring to FIG. 3 again, the clutch control unit 323 may perform control to minimize use of the clutch and the electric drive system having low residual values. The clutch control unit 323 may, if the residual value of the internal combustion drive system is greater than that of the electric drive system, determine a correction value corresponding to one pre-configured detail setting mode among a plurality of detail setting modes having different strengthening degrees for a connection state change requirement. Description for the correction value has been provided above, and thus is omitted. However, a correction value determined by the clutch control unit 323 to minimize the use of the clutch and the internal combustion drive system and a correction value determined by the clutch control unit 323 to minimize the use of the clutch and the electric drive system may be the same, or may be different according to specification.

The clutch control unit 323 may decrease, based on the determined correction value, a release determination boundary value of a drive mode involving the internal combustion drive system, to strengthen a disconnection requirement of the clutch. The present operation is described in detail with reference to FIG. 6.

Referring to FIG. 6, as described with reference to FIG. 5, a plurality of boundary values (solid line and dotted line) for controlling the drive mode of a hybrid electric vehicle may be configured for the controller 300 of the present disclosure in consideration of hysteresis. For example, a solid line may indicate an entry determination boundary value for terminating a drive mode of an electric drive system and determining entry into a drive mode using an internal combustion drive system and the electric drive system together, and a dotted line may indicate a release determination boundary value for terminating the drive mode using the internal combustion drive system and the electric drive system together and determining entry into the drive mode using the electric drive system.

The clutch control unit 323 according to an exemplary embodiment of the present disclosure may decrease a release determination boundary value based on a correction value determined earlier. The clutch control unit 323 may subtract the determined correction value from an existing release determination boundary value (dotted line) to decrease the release determination boundary value (to correspond to an alternate long and two short dashes line). The clutch control unit 323 may decrease the release determination boundary value so that the longer operation time of the drive mode involving the internal combustion drive system may be secured. The drive mode involving the internal combustion drive system may be performed in a state where the clutch is connected. Therefore, securing more operation time of the drive mode involving the internal combustion drive system may strengthen a disconnection requirement of the clutch to maintain the state of the clutch. That is, the release determination boundary value is decreased to use an internal combustion drive system having a high residual value more and maximally maintain the clutch having a low residual value at an existing operation state (e.g., connected state), whereby degradation of the residual value of the clutch and degradation of the residual value of the vehicle caused thereby may be prevented.

Referring to FIG. 3 again, the clutch control unit 323 may provide, to the outside thereof, information on a strengthened disconnection requirement or connection requirement of the clutch, and may allow an operation control of the drive mode of the vehicle based on the information.

In implementation of the controller 300 according to an exemplary embodiment of the present disclosure, the controller 300 may be implemented as a function of a higher controller, such as a hybrid controller (hybrid control unit (HCU)), controlling the overall powertrain apparatus. However, this is an example, and the present disclosure is not necessarily limited thereto. For example, the controller 300 may be implemented as a separate controller different from the higher controller, or may be implemented so that the functions thereof are dispersed to two or more different controllers.

According to an exemplary embodiment of the present disclosure, each of the determination unit 310 and the control unit 320 may be implemented by a processor (e.g., computer, microprocessor, CPU, ASIC, circuitry, logic circuits, etc.). Alternatively, the determination unit 310 and the control unit 320 may be integrated in a single processor.

According to an exemplary embodiment of the present disclosure, each of the traveling mode control unit 321, the operating point control unit 322 and clutch control unit 323 may be implemented by a processor (e.g., computer, microprocessor, CPU, ASIC, circuitry, logic circuits, etc.). Alternatively, the traveling mode control unit 321, the operating point control unit 322 and clutch control unit 323 may be integrated in a single processor.

Hereinafter, a drive control method of a hybrid electric vehicle according to an exemplary embodiment of the present disclosure is described with reference to FIG. 7 and FIG. 8, based on the configuration and operation of a hybrid electric vehicle described above with reference to FIG. 3 to FIG. 6.

Figure 7:
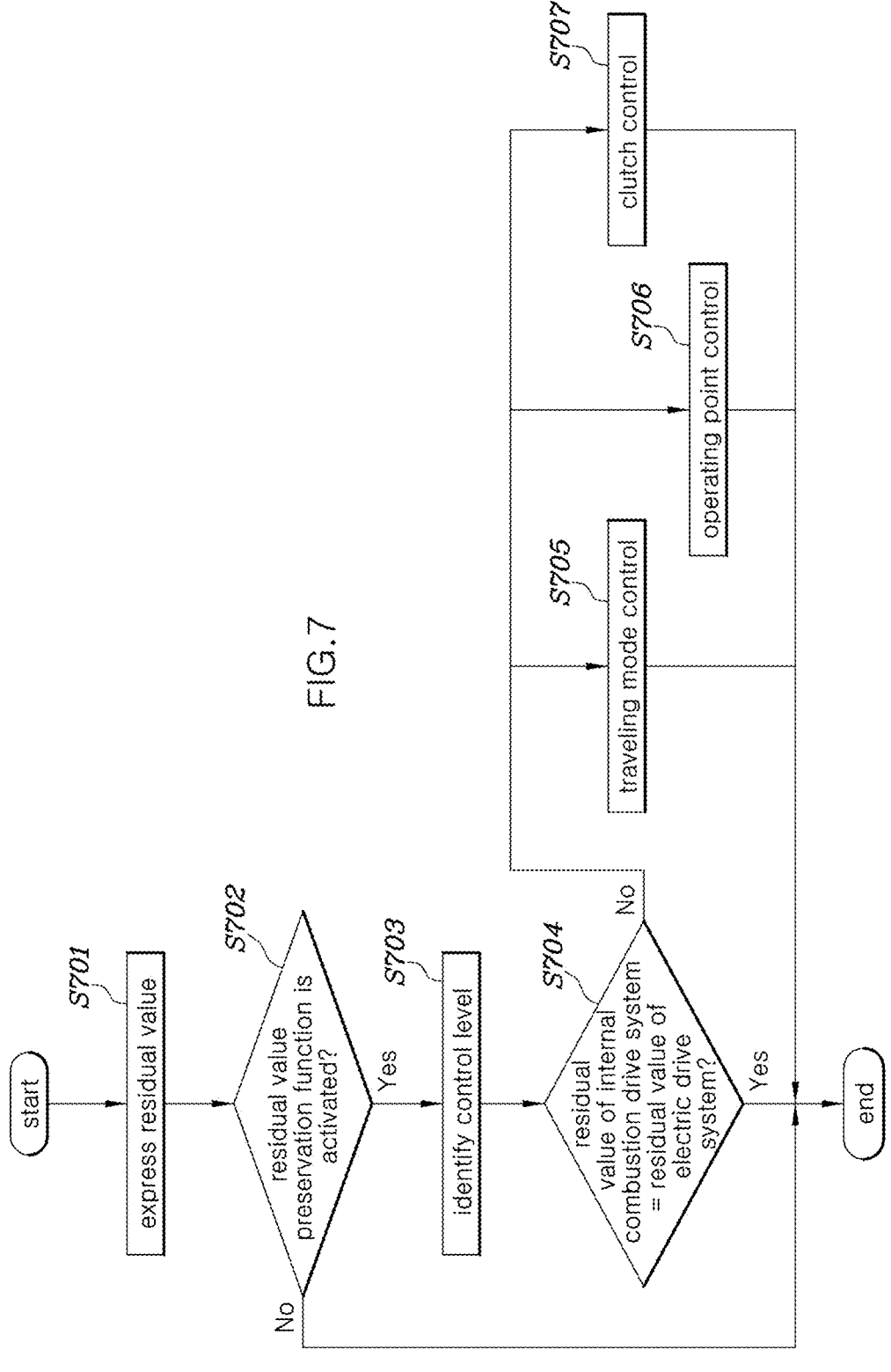
FIG. 7 and FIG. 8 are flowcharts illustrating a drive control method of a hybrid electric vehicle according to an exemplary embodiment of the present disclosure.
Figure 8:
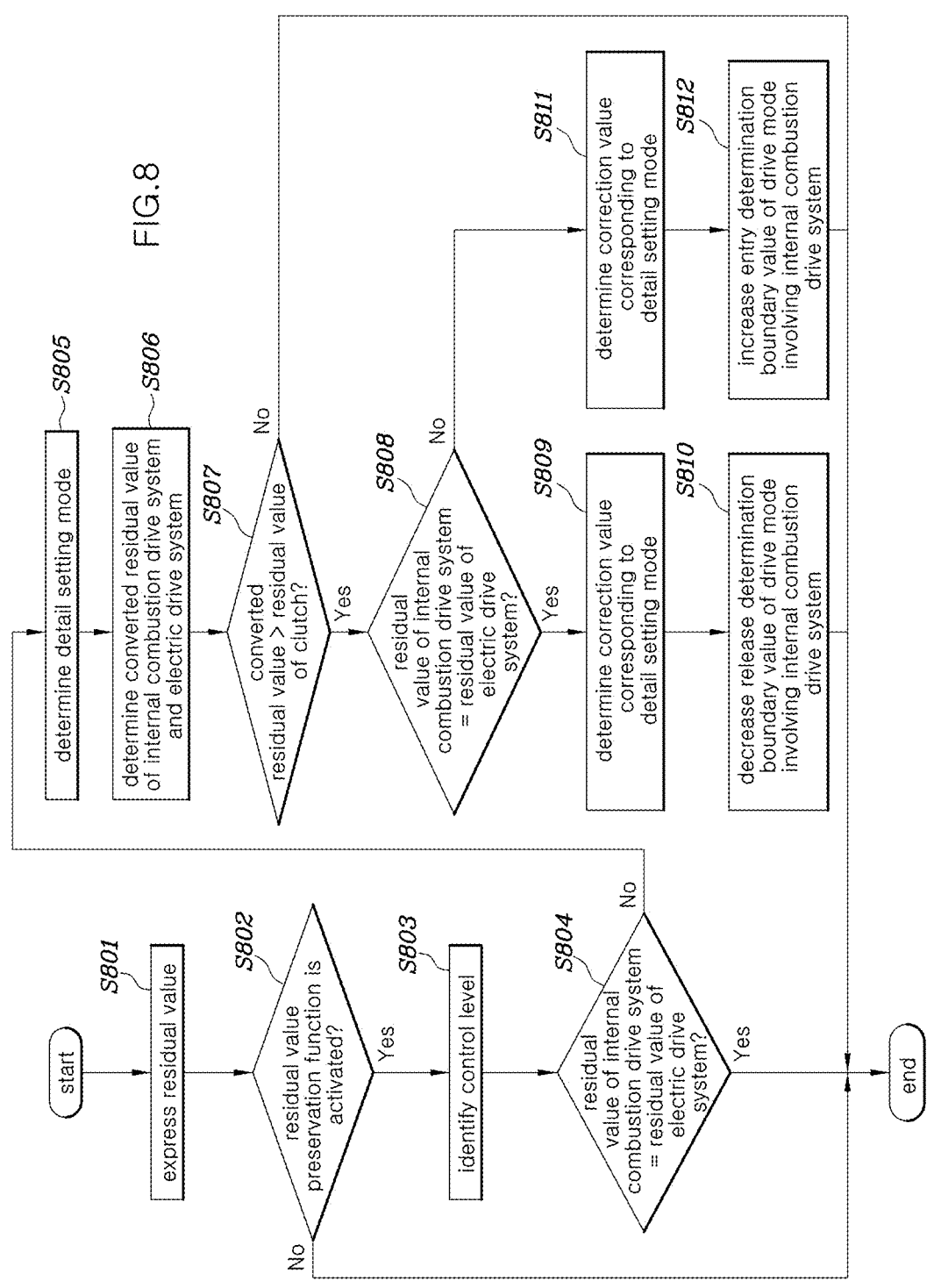

FIG. 7 and FIG. 8 are flowcharts illustrating a drive control method of a hybrid electric vehicle according to an exemplary embodiment of the present disclosure.

First, the entire process of a residual value preservation control will be described with reference to FIG. 7.

Referring to FIG. 7, first, the display device 400 may express a residual value through a screen or audio guidance (operation S701), and in the instant case, the expression of the residual value may be continuously or periodically performed, or may be performed according to an input of a user, such as a driver.

A vehicle user, such as a driver, may determine whether to activate a residual value preservation function based on the expressed residual value, and whether to activate the residual value preservation function may be transferred to the controller 300 as USM input information. The controller 300 is configured to determine whether to activate a residual value preservation control function based on input information (operation S702), and if the same is activated (Yes in operation S702), identifies a pre-configured control level to perform a residual value preservation control (operation S703).

On the other hand, if the residual value preservation control function is deactivated (No in operation S702), the controller 300 reflects the intention of the vehicle user, such as a driver, who does not want to involve a residual value preservation control, and does not perform the residual value preservation control.

Thereafter, the controller 300 may be configured to determine whether the difference between the residual values of the internal combustion drive system and the electric drive system is out of a pre-configured range, and for example, if the residual values of the internal combustion drive system and the electric drive system are not the same, may be configured to determine that the difference is out of the pre-configured range (operation S704).

If the difference between the residual values of the internal combustion drive system and the electric drive system is out of the pre-configured range (No in operation S704), the controller 300 may enter a residual value preservation control to balance the residual values, and at least one of a traveling mode control (operation S705), an operating point control (operation S706), and a clutch control (operation S707) may be performed.

On the other hand, if the difference between the residual values of the internal combustion drive system and the electric drive system falls within the pre-configured range (Yes in operation S704), the residual values of the internal combustion drive system and the electric drive system are considered to be balanced, and thus a residual value preservation control may not be performed.

Hereinafter, an operation of clutch control (operation S707) described with reference to FIG. 7 will be described in detail with reference to FIG. 8.

Referring to FIG. 8, first, the display device 400 may output information corresponding to at least one of the residual value of the internal combustion drive system and the residual value of the electric drive system, and output information corresponding to the residual value of the vehicle in replacement of or together with the information to allow the residual values to be expressed to the user, such as a driver (operation S801). In the instant case, the output of information through the display device 400 may be performed through control of the controller 300.

Thereafter, the controller 300 may be configured to determine whether to activate a residual value preservation function, the activation or deactivation of which is determined based on USM input information, (operation S802), and if the function is activated (Yes in operation S802), may identify a configured control level according to USM input information (operation S803).

If the residual value of the internal combustion drive system and the residual value of the electric drive system are the same (Yes in operation S804), the controller 300 may end a control process, and if the residual value of the internal combustion drive system and the residual value of the electric drive system are not the same (No in operation S804), the controller 300 may be configured to determine one pre-configured detail setting mode among a plurality of detail setting modes having different strengthening degrees for a connection state change requirement (operation S805). The one detail setting mode may also be previously configured, and if a residual value preservation mode is activated, the driver or user may configure one detail setting mode among the plurality of detail setting modes.

Thereafter, the controller 300 may be configured to determine a converted residual value of the internal combustion drive system and the electric drive system based on the respective residual values of the internal combustion drive system and the electric drive system (operation S806). The controller 300 may compare the determined converted residual value with the residual value of the clutch (operation S807), and if a result of the comparison indicates that the converted residual value is greater than the residual value of the clutch (Yes in operation S807), compare the residual value of the internal combustion drive system and the residual value of the electric drive system (operation S808).

If it is determined that the residual value of the internal combustion drive system is greater than the residual value of the electric drive system (Yes in operation S808), the controller 300 may be configured to determine a correction value corresponding to the one pre-configured detail setting mode (operation S809). Accordingly, the controller 300 may decrease, based on the determined correction value, a release determination boundary value of a drive mode involving the internal combustion drive system (operation S810). A detailed description for operation S810 has been provided with reference to FIG. 3 and FIG. 6 and thus is omitted.

Meanwhile, if it is determined that the residual value of the internal combustion drive system is lower than the residual value of the electric drive system (No in operation S808), the controller 300 may be configured to determine a correction value corresponding to the one pre-configured detail setting mode (operation S811). The determined correction value may be identical to or different from the correction value determined in operation S809. Accordingly, the controller 300 may increase, based on the determined correction value, an entry determination boundary value of the drive mode involving the internal combustion drive system (operation S812). A detailed description for operation S812 has been provided with reference to FIG. 3 and FIG. 5 and thus is omitted.

According to the above description, in a hybrid electric vehicle and a drive control method thereof according to an exemplary embodiment of the present disclosure, when a converted residual value of an internal combustion drive system and an electric drive system is greater than that of a clutch connecting the internal combustion drive system and the electric drive system, a connection state change requirement of the clutch is strengthened, whereby degradation of the residual value of the clutch may be prevented and simultaneously, degradation of the residual value of the hybrid electric vehicle may be avoided.

Although the present disclosure has been described and illustrated in conjunction with various exemplary embodiments thereof, it will be apparent to those skilled in the art that various improvements and modifications may be made to the present disclosure without departing from the technical idea of the present disclosure defined by the appended claims.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A drive control method of a hybrid electric vehicle, the method comprising:

determining, by a controller including a processor, residual values of an internal combustion drive system, an electric drive system, and a clutch included in the vehicle, the clutch being configured to selectively connect the internal combustion drive system and the electric drive system;

determining, by the controller, a converted residual value of the internal combustion drive system and the electric drive system based on the determined residual values of the internal combustion drive system and the electric drive system and comparing the converted residual value with the residual value of the clutch; and in response that the determined converted residual value is greater than the residual value of the clutch, strengthening, by the controller, a connection state change requirement of the clutch to perform a clutch control.

2. The method of claim 1, further including, after the determining of the residual values, outputting, by the controller, information on the determined residual values of the internal combustion drive system, the electric drive system, and the clutch.

3. The method of claim 1, wherein the comparing includes:

determining whether to enter a pre-configured residual value preservation control; and in response that the pre-configured residual value preservation control is entered, determining the converted residual value and comparing the converted residual value with the residual value of the clutch.

4. The method of claim 3, wherein the comparing further includes:

in response that the pre-configured residual value preservation control is entered, determining one pre-configured detail setting mode among a plurality of detail setting modes including different strengthening degrees for the connection state change requirement.

5. The method of claim 1, wherein the strengthening includes:

in response that the determined converted residual value is greater than the residual value of the clutch, comparing the residual values of the internal combustion drive system and the electric drive system; and in response that the residual value of the internal combustion drive system is greater than the residual value of the electric drive system, strengthening a disconnection requirement of the clutch.

6. The method of claim 5, wherein the strengthening further includes:

in response that the residual value of the internal combustion drive system is greater than the residual value of the electric drive system, decreasing a release determination boundary value of a drive mode involving the internal combustion drive system to strengthen the disconnection requirement of the clutch.

7. The method of claim 6, wherein the strengthening further includes:

in response that the residual value of the internal combustion drive system is greater than the residual value of the electric drive system, determining a correction value corresponding to one pre-configured detail setting mode among a plurality of detail setting modes including different strengthening degrees for the connection state change requirement; and subtracting the determined correction value from the release determination boundary value to decrease the release determination boundary value.

8. The method of claim 5, wherein the strengthening further includes, in response that the residual value of the internal combustion drive system is lower than the residual value of the electric drive system, strengthening a connection requirement of the clutch.

9. The method of claim 8, wherein the strengthening further includes:

in response that the residual value of the internal combustion drive system is lower than the residual value of the electric drive system, increasing an entry determination boundary value of a drive mode involving the internal combustion drive system to strengthen the connection requirement of the clutch.

10. The method of claim 9, wherein the strengthening further includes:

in response that the residual value of the internal combustion drive system is lower than the residual value of the electric drive system, determining a correction value corresponding to one pre-configured detail setting mode among a plurality of detail setting modes including different strengthening degrees for the connection state change requirement; and adding the determined correction value to the entry determination boundary value to increase the entry determination boundary value.

11. A hybrid electric vehicle comprising:

a drive system including an internal combustion drive system and an electric drive system;

a clutch configured to selectively connect the internal combustion drive system and the electric drive system; and a controller configured to determine a converted residual value of the internal combustion drive system and the electric drive system based on residual values of the internal combustion drive system, the electric drive system, and the clutch, compare the converted residual value with the residual value of the clutch, and in response that a result of the comparison indicates that the determined converted residual value is greater than the residual value of the clutch, strengthen a connection state change requirement of the clutch to perform a clutch control.

12. The hybrid electric vehicle of claim 11, wherein the controller is further configured to output information on the residual values of the internal combustion drive system, the electric drive system, and the clutch.

13. The hybrid electric vehicle of claim 11, wherein the controller is further configured to determine whether to enter a pre-configured residual value preservation control, and in response that the pre-configured residual value preservation control is entered, determine the converted residual value and compare the converted residual value with the residual value of the clutch.

14. The hybrid electric vehicle of claim 13, wherein the controller is further configured to, in response that the pre-configured residual value preservation control is entered, determine one pre-configured detail setting mode among a plurality of detail setting modes including different strengthening degrees for the connection state change requirement.

15. The hybrid electric vehicle of claim 11, wherein the controller is further configured to, in response that the determined converted residual value is greater than the residual value of the clutch, compare the residual values of the internal combustion drive system and the electric drive system, and in response that a result of the comparison indicates that the residual value of the internal combustion drive system is greater than the residual value of the electric drive system, strengthen a disconnection requirement of the clutch.

16. The hybrid electric vehicle of claim 15, wherein the controller is further configured to, in response that the residual value of the internal combustion drive system is greater than the residual value of the electric drive system, decrease a release determination boundary value of a drive mode involving the internal combustion drive system to strengthen the disconnection requirement of the clutch.

17. The hybrid electric vehicle of claim 16, wherein the controller is further configured to, in response that the residual value of the internal combustion drive system is greater than the residual value of the electric drive system, determine a correction value corresponding to one pre-configured detail setting mode among a plurality of detail setting modes including different strengthening degrees for the connection state change requirement, and subtract the determined correction value from the release determination boundary value to decrease the release determination boundary value.

18. The hybrid electric vehicle of claim 15, wherein the controller is further configured to, in response that a result of the comparison by the controller indicates that the residual value of the internal combustion drive system is lower than the residual value of the electric drive system, strengthen a connection requirement of the clutch.

19. The hybrid electric vehicle of claim 18, wherein the controller is further configured to, in response that the residual value of the internal combustion drive system is lower than the residual value of the electric drive system, increase an entry determination boundary value of a drive mode involving the internal combustion drive system to strengthen the connection requirement of the clutch.

20. The hybrid electric vehicle of claim 19, wherein the controller is further configured to, in response that the residual value of the internal combustion drive system is lower than the residual value of the electric drive system, determine a correction value corresponding to one pre-configured detail setting mode among a plurality of detail setting modes including different strengthening degrees for the connection state change requirement, and add the determined correction value to the entry determination boundary value to increase the entry determination boundary value.

* * * * *